US012730659B2

(12) United States Patent
Wang et al.

(10) Patent No.: US 12,730,659 B2
(45) Date of Patent: Sep. 8, 2026

(54) EFFICIENT DISTRIBUTION AND DEPLOYMENT OF LARGE FILES FOR GENERATING VIRTUALIZED NETWORK FUNCTIONS

(71) Applicant: RAKUTEN MOBILE, INC., Tokyo (JP)

(72) Inventors: Yidao Wang, Tokyo (JP); Takatsugu Ishikawa, Tokyo (JP); Makoto Ono, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 742 days.

(21) Appl. No.: 17/922,894

(22) PCT Filed: Jun. 29, 2022

(86) PCT No.: PCT/JP2022/025930
§ 371 (c)(1),
(2) Date: Nov. 2, 2022

(87) PCT Pub. No.: WO2024/004073
PCT Pub. Date: Jan. 4, 2024

(65) Prior Publication Data
US 2024/0220293 A1 Jul. 4, 2024

(51) Int. Cl.
*G06F 9/455* (2018.01)
*H04L 67/289* (2022.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 8/60; G06F 8/54; G06F 2009/45595; G06F 3/0647
See application file for complete search history.

(56) References Cited

U.S. PATENT DOCUMENTS 5,504,747 A * 4/1996 Sweazey ................. H04L 12/66 370/403
2003/0225851 A1* 12/2003 Fanshier ................... G06F 8/61 709/208

(Continued)

FOREIGN PATENT DOCUMENTS

JP 2019-082925 A 5/2019

OTHER PUBLICATIONS

International Search Report and Written Opinion dated Oct. 4, 2022, issued in International Application No. PCT/JP2022/025930, total pp. 9.

*Primary Examiner* — Mustafa A Amin
(74) *Attorney, Agent, or Firm* — Sughrue Mion, PLLC

(57) ABSTRACT

A deployment control server includes one or more processors. At least one of the one or more processors executes: supplying, to a deployment destination node in which a network service providing environment is to be created, a catalog file for referring a path to which the deployment destination node refers in order to download an image file for creating the network service providing environment, the path being written using a variable; supplying, to one or more image file storage nodes that are different from the deployment destination node, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable.

12 Claims, 6 Drawing Sheets

(56) References Cited

U.S. PATENT DOCUMENTS

| | | | | |
|---|---|---|---|---|
| 2005/0153778 | A1* | 7/2005 | Nelson | G07F 17/32 463/42 |
| 2005/0289535 | A1* | 12/2005 | Murray | G06F 8/61 717/172 |
| 2008/0107125 | A1* | 5/2008 | Bruckman | H04L 12/42 370/405 |
| 2008/0168182 | A1* | 7/2008 | Frank | G06F 1/12 370/254 |
| 2011/0170406 | A1* | 7/2011 | Krishnaswamy | H04L 41/0677 370/242 |
| 2014/0096135 | A1 | 4/2014 | Kundu et al. | |
| 2016/0127803 | A1* | 5/2016 | Shanson | H04N 21/25891 725/32 |
| 2016/0277288 | A1* | 9/2016 | Maruyama | H04L 45/34 |
| 2021/0160758 | A1* | 5/2021 | Huang | H04W 40/242 |
| 2021/0271506 | A1* | 9/2021 | Ganguly | H04L 41/04 |
| 2022/0147378 | A1* | 5/2022 | Tarasov | G06F 16/196 |

* cited by examiner

FIG. 1

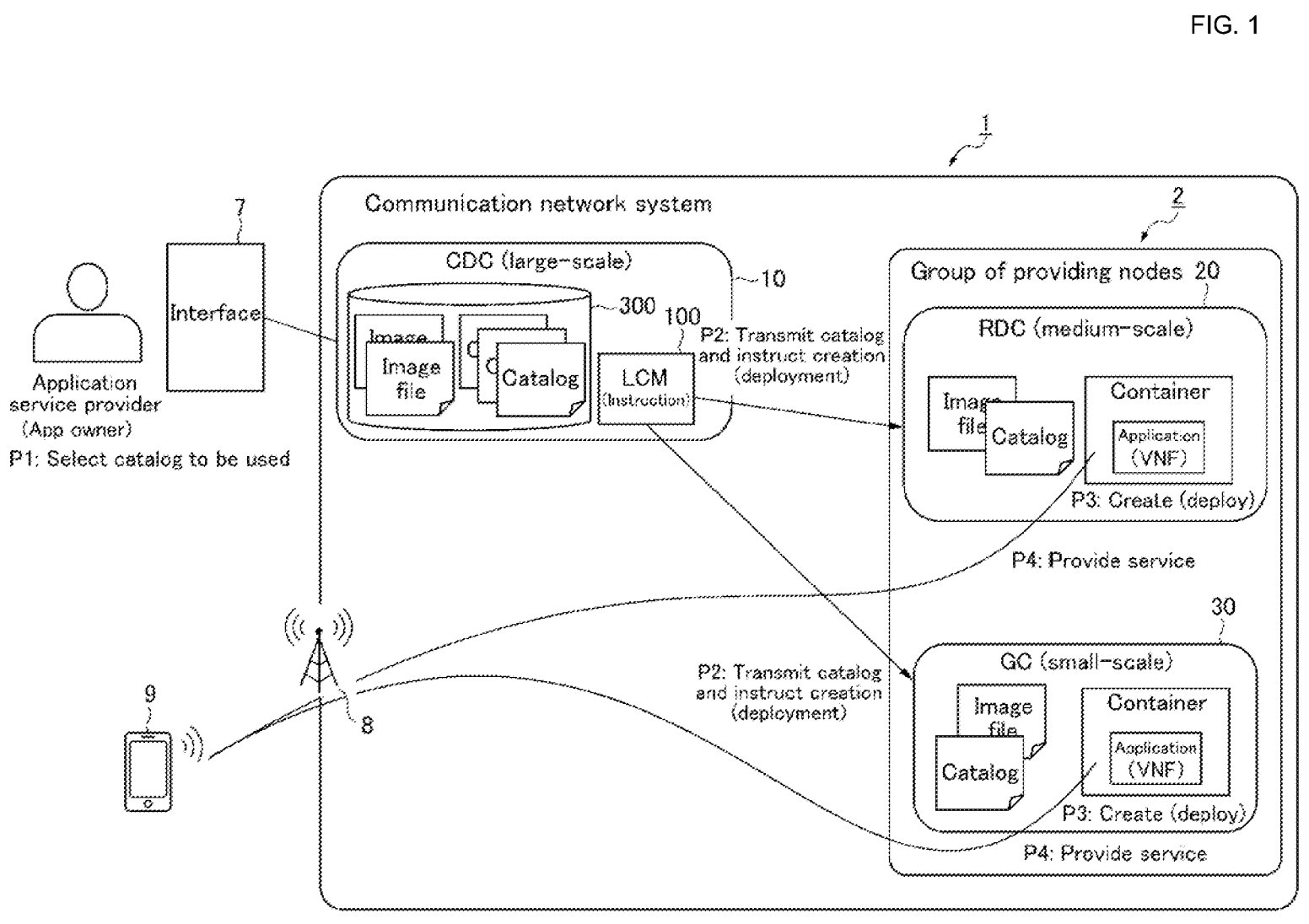

1
Communication network system
CDC (large-scale)
10
300
Image file
Image
Catalog
LCM (Instruction)
100
P2: Transmit catalog and instruct creation (deployment)
2
Group of providing nodes 20
RDC (medium-scale)
Image file
Catalog
Container
Application (VNF)
P3: Create (deploy)
P4: Provide service
30
GC (small-scale)
Image file
Catalog
Container
Application (VNF)
P3: Create (deploy)
P4: Provide service
P2: Transmit catalog and instruct creation (deployment)
8
7
Interface
9
Application service provider (App owner)
P1: Select catalog to be used

FIG. 3

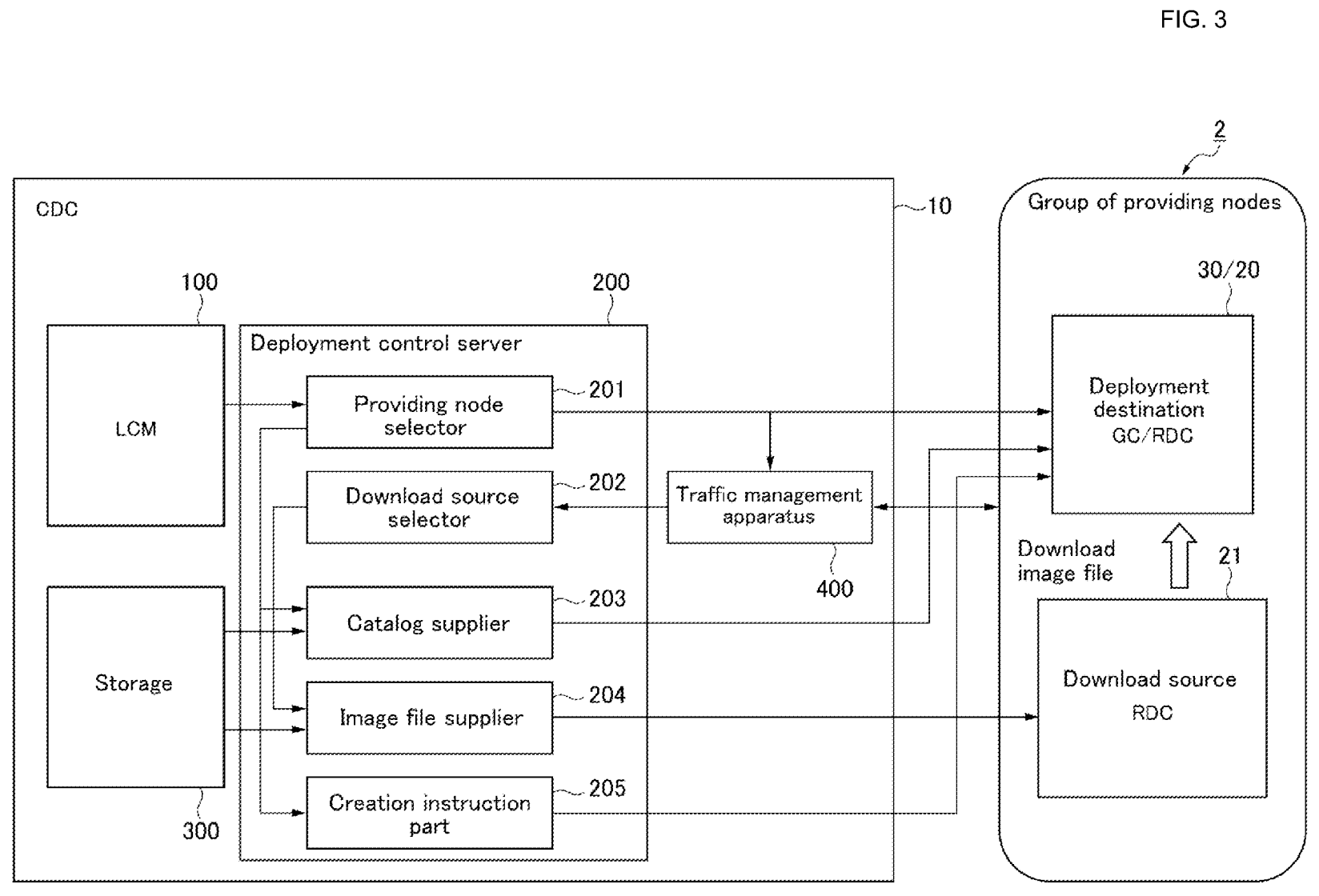

2
Group of providing nodes
30/20
Deployment destination GC/RDC
Download image file
21
Download source RDC
10
CDC
Traffic management apparatus
400
200
Deployment control server
201
Providing node selector
202
Download source selector
203
Catalog supplier
204
Image file supplier
205
Creation instruction part
100
LCM
Storage
300

1
10
CDC
51
L ring
L#1
L#2
L ring or HUB & spoke
L#3
L ring or HUB & spoke
52
53
54
55
M#1
M#2
M ring
M ring
21
RDC#1
22
RDC#2
23
RDC#3
61
62
63
64
65
66
67
68
G#1
G#2
G#3
G#4
GC ring
GC ring
GC ring
GC ring
GC#1
GC#2
GC#3
GC#4
GC#5
GC#6
GC#7
GC#8
31
32
33
34
35
36
37
38
8
9
80

EFFICIENT DISTRIBUTION AND DEPLOYMENT OF LARGE FILES FOR GENERATING VIRTUALIZED NETWORK FUNCTIONS

CROSS REFERENCE TO RELATED APPLICATIONS

This application is a National Stage of International Application No. PCT/JP2022/025930 filed Jun. 29, 2022.

TECHNICAL FIELD

The present disclosure relates to efficient distribution and deployment of large files for generating virtualized network functions.

BACKGROUND

In a communication network system, a network service providing environment, such as a container or a Virtual Network Function (VNF), which is necessary for providing services may be created (also referred to as being "deployed").

A network service providing environment may be created at a facility near users that receive services in accordance with the type of the service. Files called a catalog is used to create the network service providing environment. This catalog contains files necessary for creating the network service providing environment, such as configuration information and image files for generating containers.

SUMMARY OF INVENTION

Technical Problem

Catalogs contain a large number of files, and thus have a capacity of at least a gigabyte. In addition, catalogs have a different configuration for each network service, and therefore various types of catalogs are necessary if multiple network services are to be provided. However, storing a large number of large catalogs in advance (preliminarily, even before a creation instruction is provided) is difficult since equipment of small-scale facilities, such as Group Centers (GCs) in which a network service providing environment can be created, are small and simple. Therefore, catalogs are stored in large-scale facilities, such as Central Data Centers (CDCs), which can store a large number of large-volume files. When creating a network service providing environment, a catalog that matches a network service is selected and transmitted from the large-scale facility to the creation destination.

However, the large-scale facilities such as the CDCs are small in number and are often far away from the small-scale facilities such as the GCs. Therefore, it takes time to transmit large catalogs from the large-scale facilities to the small-scale facilities, and the time from starting to transmit the files to the completion of the creation of the network service providing environment also becomes longer.

The present disclosure reduces the time required to create a network service providing environment when the network service providing environment is created in an external facility different from a location where the catalog file necessary to create the network service providing environment is stored.

Solution to Problem

A deployment control server according to the present disclosure includes one or more processors. At least one of the one or more processors executes supplying, to a deployment destination node in which a network service providing environment is to be created, a catalog file for referring a path to which the deployment destination refers in order to download an image file for creating the network service providing environment, the path being written using a variable; supplying, to one or more image file storage nodes that are different from the deployment destination node, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable.

A communication network system according to the present disclosure includes a deployment control server, a deployment destination node in which a network service providing environment is to be deployed, and one or more image file storage nodes, wherein the image file storage node stores an image file for deploying the network service providing environment.

The deployment control server executes supplying to the deployment destination node, a catalog file for referring to a path to which the deployment destination node refers in order to download the image file, the path being written using a variable; supplying, to the one or more image file storage nodes, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable.

The deployment destination node downloads the image file from the image file storage node that was made the argument, based on the creation instruction and the argument, to create the network service providing environment.

A method for controlling deployment according to the present disclosure includes: supplying, to a deployment destination node in which a network service providing environment to be created, a catalog file for referring a path to which the deployment destination node refers in order to download an image file for creating the network service providing environment, the path being written using a variable; supplying, to one or more image file storage nodes that are different from the deployment destination node, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable.

BRIEF DESCRIPTION OF DRAWINGS

FIG. 1 is a conceptual scheme that illustrates an existing embodiment.

FIG. 3 is a functional block diagram that illustrates an arrangement of a deployment control server according to the present embodiment.

DESCRIPTION OF EMBODIMENTS

Figure 2:
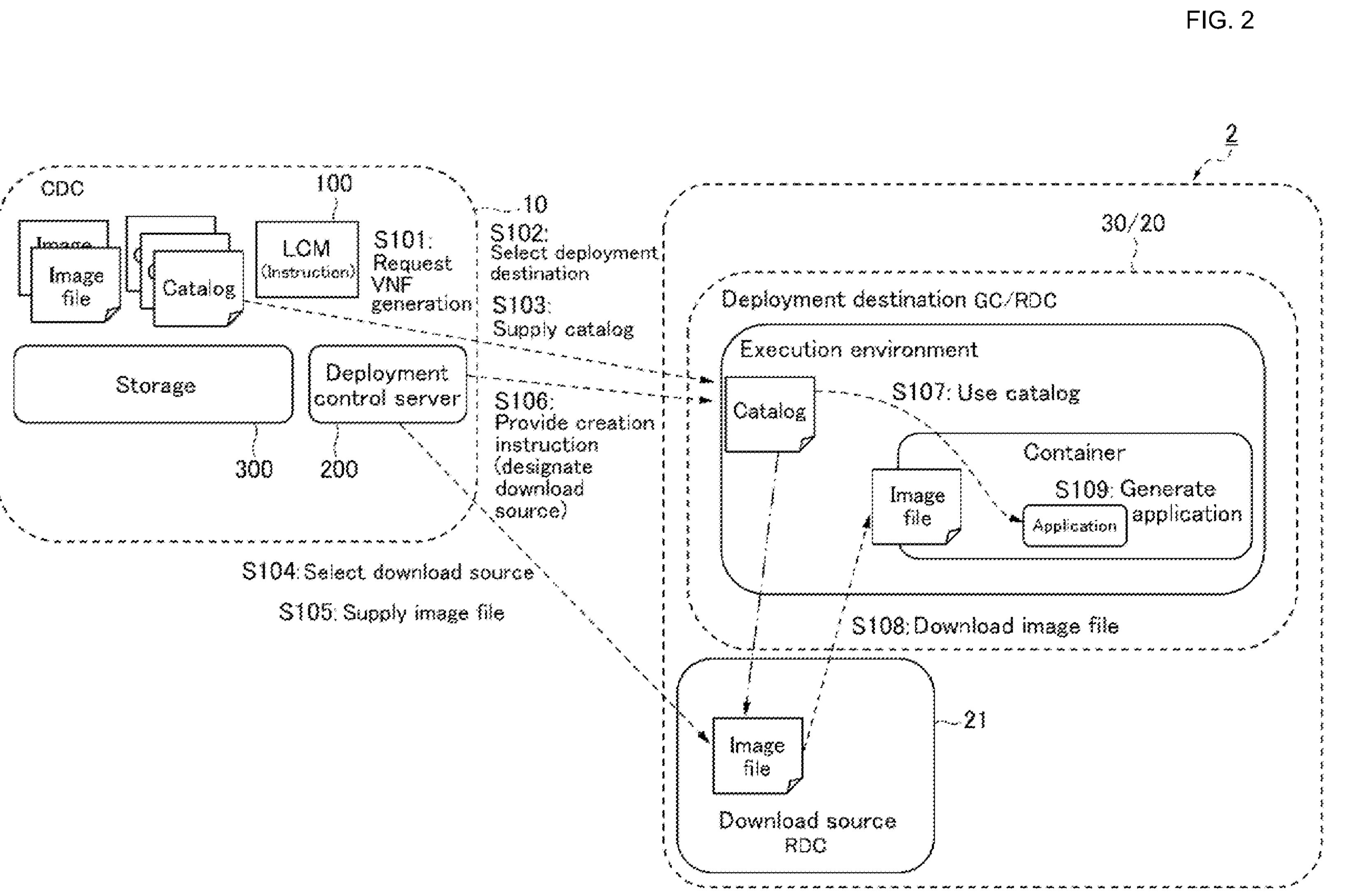
FIG. 2 is a diagram that illustrates an example of creating a network service providing environment according to the present embodiment.

Hereinafter, one embodiment of the present disclosure will be explained in detail with reference to the drawings.

FIG. 1 is a conceptual scheme that illustrates an existing embodiment. FIG. 1 shows a communication network system 1. It is anticipated that communications between the communication network system 1 and an information processing apparatus 9 are performed.

The information processing apparatus 9 may be a mobile device such as a smartphone or may be a fixed device.

Note that FIG. 1 shows a base station 8. This indicates that when the information processing apparatus 9 is a mobile device, the information processing apparatus 9 connects and communicates with the communication network system 1 via the base station 8, which transmits radio waves for radio communication. However, the communication between the information processing apparatus 9 and the communication network system 1 can be wired communication, and in this case, it is not necessary for there to be a base station 8.

The communication network system 1 includes a CDC 10, and the CDC 10 contains a function for preforming control, etc., of a communication network such as an orchestrator (not shown). Therefore, the CDC 10 can be said to be a node (control node) which, among the communication nodes constituting the communication network system 1, is responsible for control.

The CDC 10 is a large-scale facility (e.g., a central data center). It is anticipated that only a few locations in a wide area have such a large-scale facility. For example, there may be large-scale facilities in only a few locations in a range such as a country or a large state. For example, in Japan, when divided into two regions—East Japan and West Japan—there may be only one CDC 10 in each region.

An orchestrator is a system that is responsible for execution, management, repair, etc., of functions executed in the communication network system 1 such as a network slice.

There is a lifecycle manager (LCM) 100 in the orchestrator. The LCM 100 manages applications such as a Virtual Network Function (VNF). The LCM 100 may be a single device or a system configured from a plurality of devices.

An application such as the Virtual Network Function (VNF) is used to implement a network service that is provided to the information processing apparatus 9 by the communication network system 1. In order to construct an application, a file called a catalog (also called a catalog file or a bundle catalog) is used. A catalog contains configuration information for the application, and may be stored in a storage 300 within the CDC 10 or may be held by the orchestrator.

The catalog for generating a VNF and a virtual environment for implementing the VNF generally contains an image file for generating virtual environment such as a container (image files for generating containers are also called container images; a Docker image is an example thereof). That is, in general, an image file is one of a group of files contained in a catalog. However, the present embodiment distinguishes the image file from the catalog and regards it as a separate file. In other words, the catalog is a file, among a group of files necessary for creating a network service providing environment, which has an image file excluded therefrom, and includes configuration information, etc. The image file may also be stored in the storage 300.

The configuration information included in the catalog is frequently updated (changed). However, the image file is not updated as often as the configuration information. Therefore, the catalog and the image file may be managed separately. For example, particular types of image files that are frequently used may also be stored in medium-scale facilities such as Regional Data Centers (RDCs).

The file size of a catalog that does not include an image file is in the order of kilobytes, but the file size of the image file is in the order of gigabytes.

The image files may be different for each catalog, but the same image file may be used for different catalogs (that is, the catalog and the image file may have a many-to-one relationship).

The communication network system 1 includes a group of providing nodes 2 configured from one or more providing nodes. A providing node indicates a server or a system in which applications for providing various services to the information processing apparatus 9 via the communication network system 1 can be deployed. More specifically, the providing nodes can construct virtual environment such as containers, and the applications are deployed as VNFs on the virtual environment. In other words, VNFs that implement applications are generated in the virtual environment on each providing node. Hereinafter, a virtual environment in which a VNF for implementing an application is generated is called a network service providing environment.

Each providing node of the group of providing nodes 2 may be independent of each other. That is, one or more providing nodes of the group of providing nodes 2 may be managed by a vendor separate from the communication network system 1. Moreover, the providing nodes managed by the vendor separate from the communication network system 1 may be outside the communication network system 1.

In FIG. 1, each providing node of the group of providing nodes 2 is contained in an RDC 20 or a GC 30. Although FIG. 1 shows one RDC and one GC, the number of RDCs and the GCs in the communication network system 1 is not particularly limited.

The RDC 20 is a medium-scale facility (e.g., a regional data center) and exists, for example, in each regional level such as a prefecture.

The GC 30 is a small-scale facility (e.g., a facility corresponding to a group of base stations) that is directly connected to each base station and that is close to users using the communication service.

FIG. 1 also shows an interface 7. This indicates that an application service provider that desires to generate an application in a providing node to provide a service by means of the application can request, via the interface 7, the communication network system 1 to generate the application.

The procedure for deploying an application is described briefly with reference to FIG. 1.

First, the application service provider selects a catalog used to generate an application based on the functions, etc.

of the application, via the interface 7 of the communication network system 1 (see reference sign P1).

The LCM 100 selects one providing node, among the group of providing nodes 2, that constructs a network service providing environment, based on the selected catalog and available resources of the providing nodes, etc. Hereinafter, the selected providing node (that is, the application execution environment) is called a "deployment destination". As a deployment destination, a providing node in the RDC 20 may be selected or a providing node in the GC 30 may be selected. In addition, the facility (the RDC 20 or the GC 30) itself where the deployment destination providing node exists may also be called a "deployment destination".

FIG. 1 shows both cases where the deployment destination is in the RDC 20 and where the deployment destination is in the GC 30. In many cases, the providing node in the GC 30 is selected as the deployment destination rather than the providing node in the RDC 20.

The LCM 100 then transmits, to the deployment destination, a catalog and an image file used to create a network service providing environment for implementing the application. Then, an instruction to create the network service providing environment is provided (see reference sign P2).

The deployment destination deploys a VNF in accordance with a request. That is, the VNF is generated on a container of the deployment destination (see reference sign P3).

A user that wants to use a network service accesses the communication network system 1 by means of the information processing apparatus 9 and then enjoys the network service connected to the VNF in the deployment destination. That is, the generated VNF provides the service (see reference sign P4).

In the existing embodiment shown in FIG. 1, the catalog and the image file are transmitted from the CDC to the deployment destination (the GC or the RDC) (see reference sign P2). Here, it takes time for the deployment destination to download the catalog and the image file from the CDC. Therefore, the time from starting to transmit the catalog and the image file to the completion of the creation of the network service providing environment also becomes longer.

Accordingly, in the embodiment of the present disclosure, a deployment control server that mediates communication between the LCM 100 and the group of providing nodes 2 of FIG. 1 is configured. Here, it is anticipated that one deployment control server is configured, but multiple servers may implement the processing of the deployment control server. In other words, a control system that mediates communication between the LCM 100 and the group of providing nodes 2 may be constructed.

FIG. 2 is a diagram that illustrates an example of creating a network service providing environment according to the present embodiment. In FIG. 2, the same reference signs are given to same elements as in FIG. 1.

As illustrated in FIG. 2, the CDC 10 is provided with a deployment control server 200 in addition to the LCM 100 and the storage 300.

Hereinafter, the operations of the deployment control server 200, according to the present embodiment, when a deployment of a VNF is requested will be described with reference to FIG. 2.

The deployment control server 200 obtains, from the LCM 100, a request to generate a VNF, with a catalog attached (reference sign S101).

Based on the attached catalog, etc., the deployment control server 200 selects, among a group of providing nodes 2, a deployment destination providing node (i.e., a providing node which is a deployment destination) in which the VNF is generated (reference sign S102). Selecting the deployment destination providing node may be performed by a providing node selector 201 of FIG. 3, which is described later. The deployment destination can be a GC or an RDC. By using a catalog, the LCM 100 does not need to recognize to which providing node of the plurality of providing nodes 2 the request is to be made, and the deployment control server 200 can determine the destination of the request.

Moreover, in FIG. 2, the deployment destination is a providing node in the GC 30 or the RDC 20 as in the example of FIG. 1.

A catalog for generating a VNF is obtained from the storage 300 and supplied to the deployment destination (reference sign S103). Supplying the catalog to the deployment destination may be performed by a catalog supplier 203 of FIG. 3, which will be described later.

The deployment control server 200 selects a storage (called a "download source"; moreover, the facility having the download source storage may also be called a "download source") from which the selected deployment destination downloads an image file for generating the VNF (reference sign S104). Selecting a download source may be performed by a download source selector 202 of FIG. 3, which will be described later.

In FIG. 2 the download source is a storage in the RDC 21. As described above, since the file size of the image file is in gigabytes, in order to reduce the time required for communication as much as possible, the download source can be an RDC near the deployment destination. For example, the deployment destination may be the RDC 20, and the download source may be the RDC 21.

When the deployment control server 200 selects a download source, an image file for generating the VNF is obtained from the storage 300 and supplied to the download source (reference sign S105). Supplying the image file to the download source may be performed by an image file supplier 204 of FIG. 3, which will be described later.

Here, the image file is transmitted after the download source is selected, but the image file can be transmitted in advance to one or more RDCs capable of storing the image file and then a download source may be selected from the one or more RDCs in which the image file is stored. Accordingly, the communication node in which the image file is stored is also described as an image file storage node. That is, the image file may be transmitted to the image file storage node before or after selecting the download source.

The deployment control server 200 provides, to the deployment destination, a creation instruction for executing creating a network service providing environment by using a catalog file used to generate an image file (reference sign S106). In this case, a designation of the download source of the image file is provided together with the creation instruction. The download source may be designated by a path of the download source.

For example, the path of the image file to be used can also be written in the catalog, in particular, in the configuration information contained in the catalog. If the path of the image file is written in the catalog, the deployment destination that received the creation instruction downloads the image file of this path. In addition, it is also possible to render the path of the image file as a variable. Therefore, when providing the creation instruction, designating the path of the download source as an argument of this variable allows the deployment destination to obtain the image file from the designated download source.

Thus, by making it possible to designate the download source of the image file together with the creation instruction, there is no need to prepare a catalog for each download source of the image file.

Providing a creation instruction that designates a download source may be performed by a creation instruction part 205 of FIG. 3, which will be described later.

The deployment destination uses a catalog based on a creation instruction (reference sign S107), downloads an image file from a download source based on a designated path (reference sign S108), and generates a VNF (application) (reference sign S109). As a result thereof, a network service providing environment is created in an execution environment of the deployment destination.

Therefore, in order to create a network service providing environment in a deployment destination, an image file is required in addition to a catalog, and thus, appropriately selecting an image file storage node for downloading the image file can shorten the required time from providing a creation instruction to the deployment destination to completing the creation of the network service providing environment, when compared to downloading from the CDC.

Moreover, the load on the communication network system for the deployment destination to obtain catalogs and image files can be reduced when compared to downloading the same from the CDC.

It is also possible to store catalogs in the RDC and have the GC download the catalogs from the RDC. However, catalogs may be changed frequently. Therefore, in terms of managing catalogs, it is preferable for the GC to obtain catalogs from the CDC.

FIG. 3 is a functional block diagram that illustrates an arrangement of a deployment control server 200 according to the present embodiment.

In FIG. 3, the deployment control server 200 contained in a CDC 10 is interposed between an LCM 100 and a group of providing nodes 2. Note that the CDC 10 contains a storage 300 in which catalogs and image files are stored. The CDC 10 of FIG. 3 also contains a traffic management apparatus 400 that retains measurement results of communication traffic between the CDC 10 and the group of providing nodes 2.

The arrangement of the deployment control server 200 is described with reference to FIG. 3. The deployment control server 200 includes a providing node selector 201, a download source selector 202, a catalog supplier 203, an image file supplier 204, and a creation instruction part 205.

In response to a request from the LCM 100 to deploy a VNF, the providing node selector 201 selects which providing node 2 among the plurality of providing nodes should be used to create a network service providing environment. The request from the LCM 100 to deploy a VNF may be given from an application service provider via an interface 7.

A providing node that creates a network service providing environment may be selected as appropriate. For example, the providing node selector 201 may select a deployment destination providing node, from among the group of providing nodes 2, based on resources requested by the catalog corresponding to the request for creation, and the available resources of each providing node. Alternatively, upon predetermining the providing nodes that correspond to the catalog and the priority of the providing nodes, among the providing nodes corresponding to the catalog, a providing node that has the necessary available resources and the highest priority may be approved as the deployment destination.

In FIG. 3, the providing node is in the GC 30 or the RDC 20 as in the example of FIG. 2.

When a deployment destination providing node is selected, the download source selector 202 selects a storage (download source) from which the deployment destination downloads an image file for generating a VNF. In FIG. 3, the download source is a storage in the RDC 21.

The download source may be selected from image file storage nodes that store image files to be used. Alternatively, a communication node that does not store image files may also be a candidate, and when the communication node that does not store image files is selected, an image file can be transmitted to the selected destination.

The method for selecting a download source will be described with specific examples later.

The catalog supplier 203 transmits a catalog for generating a VNF to the deployment destination providing node selected by the providing node selector 201. The catalog transmitted by the catalog supplier 203 is obtained from the storage 300.

When the download source selected by the download source selector 202 does not have an image file scheduled to be deployed, the image file supplier 204 transmits the image file to the download source. The image file transmitted by the image file supplier 204 is obtained from the storage 300. Note that the image file supplier 204 may transmit a designated image file to a designated image file storage destination.

The creation instruction part 205 instructs the deployment destination providing node selected by the providing node selector 201 to generate a VNF by using the catalog transmitted to the deployment destination and the image file from the download source selected by the download source selector 202. More specifically, the creation instruction part 205 supplies, to the deployment destination, a creation instruction to download the image file from a path written in the catalog file (in the catalog, this path represented as a variable) and thereby execute creation of a network service providing environment, and the path for downloading the image file from the download source selected as an argument with respect to the variable.

The deployment destination providing node that has obtained the creation instruction downloads the image file from the download source, and generates a network service providing environment using the image file and the transmitted catalog, according to the creation instruction.

There are several methods for the download source selector 202 to select a download source, and the methods are not particularly limited.

For example, a download source may be selected based on the resources of the image file storage node. For example, the more resources available, the easier it may be for a download source to be selected.

Alternatively, a download source may be selected based on the geographical distance with respect to the deployment destination. For example, the shorter the distance, the easier it may be for a download source to be selected.

For example, a download source may be selected based on the time required for the deployment destination to perform downloading from the image file storage node. As a result thereof, it is possible to shorten the time required for until the completion of creating a network service providing environment in the deployment destination. For example, when there are one or more image file storage nodes, the download time may be estimated from each image file storage node, and based on this estimated result, one of the image file storage nodes may be selected as the download source. The download time may be estimated, for example, based on previous communication history or communication traffic. Alternatively, if the distance between an image file storage node and a deployment destination is small enough to be negligible, it may be simply considered that the download time is shorter when there is less communication traffic. Therefore, a download source may be selected based on the communication traffic. Note that a measurement result of communication traffic is obtained from the traffic management apparatus 400.

Moreover, a download source may be selected based on the degree of congestion in the lines between the target nodes, such as the ratio (bandwidth) of the current traffic with respect to the maximum transmission rate, or the network quality between the communication nodes, such as packet loss, delay, and packet arrival interval variation. In addition, multiple requirements may also be considered. For example, the load of the image file storage node and the traffic with respect to the image file storage node may be both considered. For example, suppose that the communication rate between the deployment destination and each image file storage node is T (unit: Mbps), and the load of each image file storage node (e.g., storage or CPU usage rate, etc.) is L. In this case, given a positive weight w, an RDC that maximizes a weighted traffic $T'=T-w\times L$ may be selected as the download source.

The above explanation of the method for selecting a download source stated that a download source is selected from image file storage nodes, but the same procedure may also be applied when selecting a download source from a communication node that may serve as an image file storage node, and in this case, the image file storage node can be interpreted as being the communication node that may be the image file storage node.

As a specific example, a case is described with reference to FIG. 4, where the deployment destination is a GC, and an RDC from which the deployment destination can download an image file in the shortest time is selected as the download source.

Figure 4:
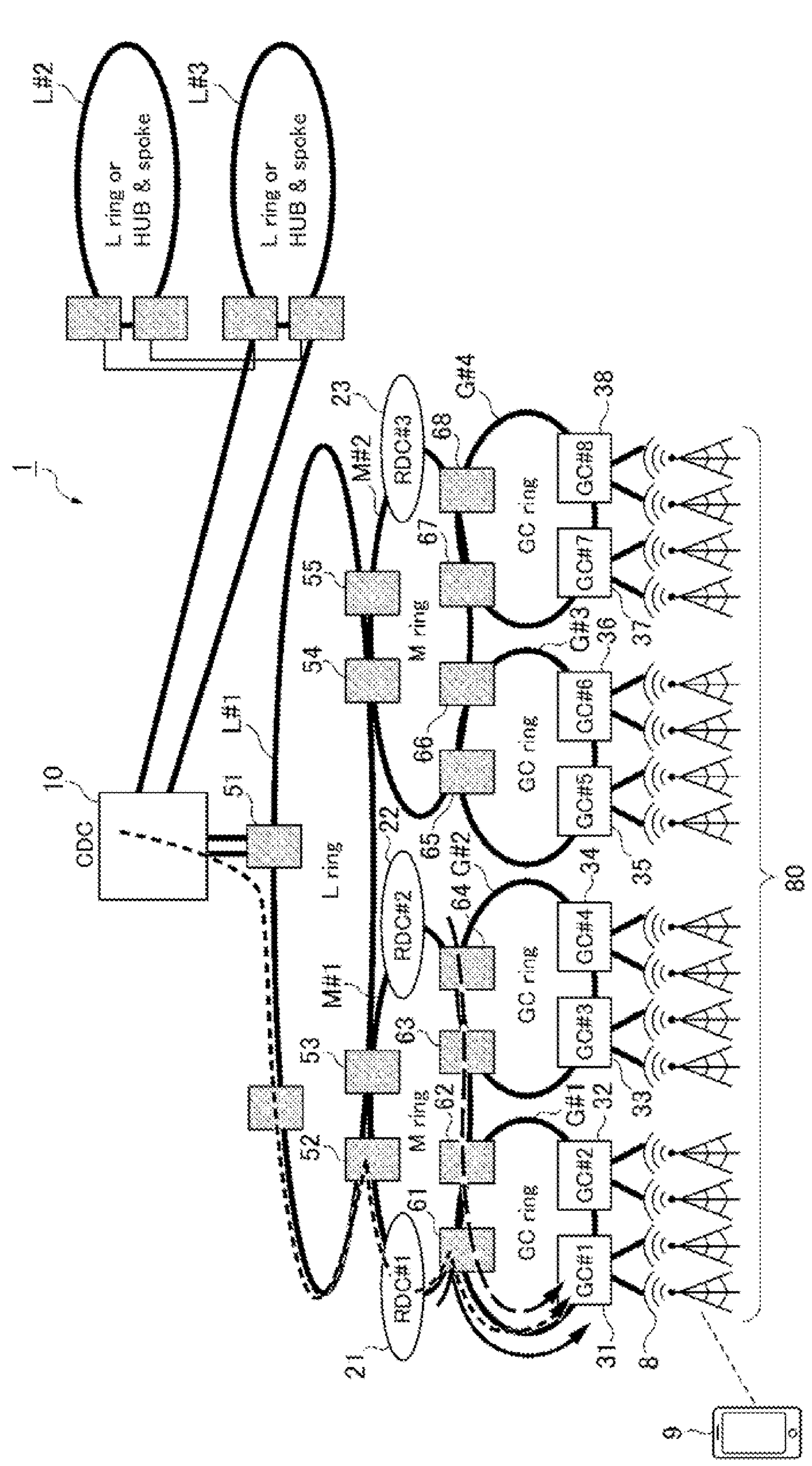
FIG. 4 is a diagram that illustrates an example of connections between a CDC, RDCs, and GCs.

FIG. 4 is a diagram that illustrates an example of connections between a CDC, RDCs, and GCs.

FIG. 4 shows a CDC 10, three RDCs from an RDC #1 to an RDC #3 (see reference signs 21 to 23), eight GCs from a GC #1 to a GC #8 (see reference signs 31 to 38), and a group of base stations 80 including one or more base stations.

FIG. 4 further shows boundary nodes (see reference signs 51 to 55 and 61 to 68).

FIG. 4 shows that the communication network system 1 is configured from a plurality of ring networks that are annularly connected to communication nodes (facilities) such as RDCs and GCs.

In the example of FIG. 4, the communication network system 1 includes L-rings, M-rings, and GC-rings. The L-rings are top-level ring networks that include the CDC. The GC-rings are low-level rings that annularly connects the GCs. The M-rings are ring networks that are located between the L-ring and the M-rings. The RDCs may exist in the M-rings.

The L-rings, the M-rings, and the GC-rings share one or more communication nodes with other ring networks, thereby allowing communication with other ring networks. These shared communication nodes are described as boundary nodes.

More specifically, in FIG. 4, the CDC 10 is communicably connected to the one or more L-rings (see an L #1, an L #2, and an L #3) via boundary nodes (e.g., a boundary node 51 that relays the CDC 10 and the L #1). Each L-ring is communicably connected to one or more boundary nodes. For example, the L #1 connects five boundary nodes (reference signs 51 to 55) in a ring shape.

Each L-ring is communicably connected to one or more M-rings (see a M #1 and a M #2) via boundary nodes. For example, the L #1 is connected to the M #1 via two boundary nodes (reference signs 52 and 53). The L #1 is also connected to the M #2 via two boundary nodes (reference signs 54 and 55).

Each M-ring is communicably connected to one or more boundary nodes. Each M-ring can also communicably connect to one or more RDCs. For example, the M #1 connects six boundary nodes (reference signs 52, 53, 61, 62, 63, 64) with the RDC #1 and the RDC #2 in a ring shape. The M #2 connects six boundary nodes (reference signs 54, 55, 65, 66, 67, 68) with one RDC #3 in a ring shape.

Each M-ring may also communicably connect to the GC-rings (see a G #1 to a G #4) via the boundary nodes. For example, the M #1 is connected to the G #1 via two boundary nodes (reference signs 61 and 62). The M #1 is also connected to the G #2 via two boundary nodes (reference signs 63 and 64).

Each GC-ring communicably connects to the one or more boundary nodes and the one or more GCs. For example, the G #1 connects two boundary nodes (reference signs 61 and 62) with the GC #1 and the GC #2 in a ring shape. Each GC may communicably connect to base stations.

FIG. 4 shows one or more base stations leading to the CDC 10 via the L #1 as a group of base stations 80.

Although FIG. 4 shows three L-rings, two M-rings, and four GC-rings, and also shows three RDCs, eight GCs, 16 base stations, and 18 boundary nodes, these are not limited in number and connection form in any way.

A case will be described where the RDC from which the deployment destination GC can download an image file in the shortest time is the download source. Regarding such a download source RDC, the GC ring to which the deployment destination GC belongs may connect, via the boundary nodes, to the M-ring to which the download source RDC belongs.

In the example of FIG. 4, an information processing apparatus 9 is in communication with a base station 8 that belongs to the group of base stations 80, and the base station 8 is communicably connected to the GC #1. Here, suppose that a deployment destination providing node is in the GC #1.

The GC #1 is within the G #1. The G #1 is connected to the M #1 via the boundary node 61 and the boundary node 62. The M #1 includes the RDC #1 and the RDC #2.

Therefore, in the example of FIG. 4, for the deployment destination GC #1, the G #1, which is a GC-ring that includes the GC #1, is specified, and then the M-ring to which the G #1 is connected, that is, the M #1, is specified. It is clear that the GC #1 requires less time to communicate with the RDC #1 or the RDC #2 included in the M #1 than the RDCs included in an M-ring other than the M #1. Therefore, an RDC from which the GC #1 can download an image file in the shortest time is considered to be an RDC included in the M #1 ring. Accordingly, the RDC #1 or the RDC #2 can be a candidate for a download source.

Thus, in order to select an RDC from which a deployment destination GC can download an image file in the shortest time, a GC-ring including the deployment destination GC is specified, and then a M-ring to which this GC-ring is connected is also specified based on topology information, etc. Thus, an RDC included in this M-ring becomes a candidate RDC from which the deployment destination GC can download an image file in the shortest time.

Therefore, based on the connection forms of the CDC, the RDCs, and the GCs, it is possible to narrow down the candidates for a download source. In general, a deployment destination can be searched at high speed.

Then, from the narrowed down download source candidates, a download source is determined.

For example, in the example of FIG. 4, suppose that the communication rate between the GC #1 and the RDC #1 is T1 (the unit is, for example, Mbps), and the communication rate between the GC #1 and the RDC #2 is T2 (the unit is, for example, Mbps). In this case, if T1 is larger than T2, the download source can be the RDC #1, and if T2 is larger than T1, the download source can be the RDC #2.

Traffic measurement can be performed using Two-Way Active Measurement Protocol (TWAMP). In order to measure traffic with TWAMP, TWAMP agents needs to be prepared at measurement points, and thus, the TWAMP agents are installed in a communication node that may be the deployment destination and a communication node that may be the download source.

Note that communication nodes (relay nodes) that commonly exist in communication routes between the deployment destinations and each download source candidate and that relay communication between the deployment destinations and each download source candidate can also serve as a reference point for determining a download source, instead of the deployment destinations.

For example, the boundary node 61 exists in both communication routes between the GC #1 and the RDC #1 and between the GC #1 and the RDC #2. In this case, the download source selector 202 compares the traffic between the boundary node 61, instead of the GC #1, and the RDC #1 with the traffic between the boundary node 61 and the RDC #2, and may select either the RDC #1 or the RDC #2 as the download source.

As described above, the TWAMP agents need to be installed at the measurement points for measuring traffic, but in this case, installing the TWAMP agents in boundary nodes instead of the GCs can reduce the load on the GCs and standardize the measurements of the GCs belonging to the same GC-ring.

Figure 5:
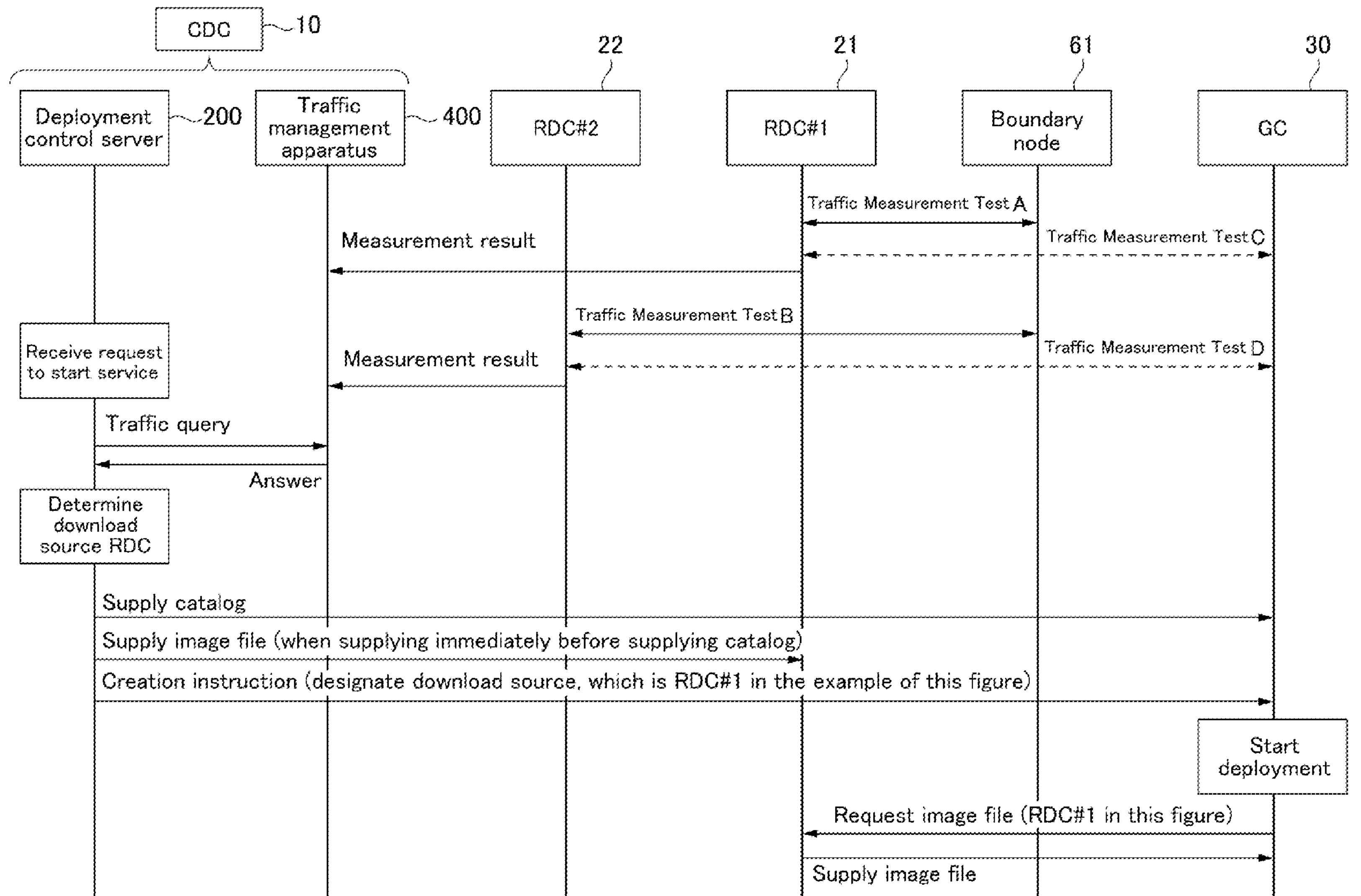
FIG. 5 is a sequence diagram that illustrates an example of creating a network service providing environment according to the present embodiment.

Next, the creation process of a network service providing environment according to the present embodiment is described in detail with reference to FIG. 5. FIG. 5 is a sequence diagram that illustrates an example of creating a network service providing environment according to the present embodiment.

FIG. 5 shows a CDC 10 that contains a deployment control server 200 and a traffic management apparatus 400, an RDC 21 (see the RDC #1 in FIG. 4) that is a candidate of a download source, an RDC 22 (see the RDC #2 in FIG. 4), and a GC 30 that is a deployment destination. Note that the GC 30 that is the deployment destination corresponds to the GC #1 in FIG. 4.

A GC-ring to which the GC 30 belongs (see the G #1 in FIG. 4) is connected to, via a boundary node 61, a M-ring to which the RDC 21 and the RDC 22 belong (see the M #1 in FIG. 4). FIG. 5 further includes the boundary node 61 (which can also be the boundary node 62 of FIG. 4).

A traffic measurement test ("Traffic Measurement Test A") is performed between the RDC 21 and the boundary node 61. The measurement result is transmitted to the traffic management apparatus 400.

A traffic measurement test ("Traffic Measurement Test B") is performed between the RDC 22 and the boundary node 61. The measurement result is transmitted to the traffic management apparatus 400.

The Traffic Measurement Tests A and B allow the traffic management apparatus 400 to collect the traffic measurement results between the boundary node 61 and the RDC 21 and between the boundary node 61 and the RDC 22.

Note that instead of the Traffic Measurement Tests A and B, a traffic measurement test between the RDC 21 and the GC 30 ("Traffic Measurement test C") and a traffic measurement test between the RDC 22 and the GC 30 ("Traffic Measurement Test D") may be performed. The Traffic Measurement Tests C and D allow the traffic management apparatus 400 to collect the traffic measurement results between the GC 30 and the RDC 21 and between the GC 30 and the RDC 22.

These traffic measurement tests and transmission of measurement results are performed periodically. A measurement result immediately before the execution of deployment may be used to select a download source.

Alternatively, traffic at the same time of day as the execution of deployment may be obtained on a different day than the day of executing the deployment. Suppose that a deployment is executed at 23:00, the deployment may be executed more systematically, for example, by measuring the traffic near 23:00 on the day before the day of executing the deployment and then using the result to select a download source.

Moreover, from the results of the traffic measurement tests performed periodically, the past statistical history may be used to derive the time of day at which the network is not congested, thereby further reducing the download time of the image file related to the deployment.

As described above, when measuring traffic using TWAMP, TWAMP agents need to be prepared at the measurement points. Therefore, in order to perform the Traffic Measurement Tests C and D between the RDC 21 and the GC 30 and between the RDC 22 and the GC 30, a TWAMP agent needs be installed in the GC 30. In addition, since the measurement results need to be transmitted from the GC 30 to the traffic management apparatus 400, the load of the GC 30 increases. Therefore, the load of the GC 30 can be better decreased by installing the TWAMP agents in the relay nodes, particularly the boundary node 61, rather than the GC 30, and performing the Traffic Measurement Tests A and B between the boundary node 61 and the RDC 21 and between the boundary node 61 and the RDC 22.

The example of creating the network service providing environment will now be discussed again. The deployment control server 200 determines, as a download source, an RDC from which the deployment destination GC 30 is estimated to be capable of downloading an image file in the shortest time.

Therefore, upon receiving a request to start a service, the deployment control server 200 queries the traffic management apparatus 400 concerning the traffic related to the Traffic Measurement Tests A, B, C, or D and obtains an answer. Moreover, in order to obtain information related to the traffic, other procedures can be carried out, such as the deployment control server 200 directly queries the RDCs, the GCs, or the boundary nodes.

The Traffic Measurement Tests A and B allow the RDC having the maximum traffic with the boundary node 61 to be determined as a download source RDC.

Alternatively, the Traffic Measurement Tests C and D allow the RDC having the maximum traffic with the deployment destination GC 30 to be determined as a download source RDC.

Thus, in FIG. 5, the RDC 21 from which the deployment destination GC 30 can download the image file in the shortest time is determined as the download source.

The deployment control server 200 supplies a catalog to the deployment destination GC 30. In addition, an image file is supplied to the download source RDC 21. Note that since supplying an image file to the download source requires more load than supplying a catalog, supplying an image file can be performed before or after, such as few hours or few days before or after, supplying a catalog.

The deployment control server 200 provides a creation instruction to the deployment destination GC 30. This creation instruction specifies that the image file should be downloaded from the download source RDC 21.

Based on the creation instruction, the deployment destination GC 30 uses the catalog supplied from the deployment control server 200 and downloads an image file from the download source RDC 21 to create a network service providing environment.

In the example of FIG. 5, the GC 30 requests the download source RDC 21 for an image file, and the RDC 21 supplies the image file to the GC 30.

Note that the deployment control server 200 can specify the creation of the network service providing environment by the GC 30, that is, the timing of downloading the image file, by considering not only the traffic but also the load of the download source RDC 21.

Moreover, the traffic or the load on the RDC 21 can be inferred from the stored data to create a network service providing environment at a most appropriate time of day. For example, a catalog can be transmitted during the daytime and a network service providing environment can be created during the nighttime.

Figure 6:
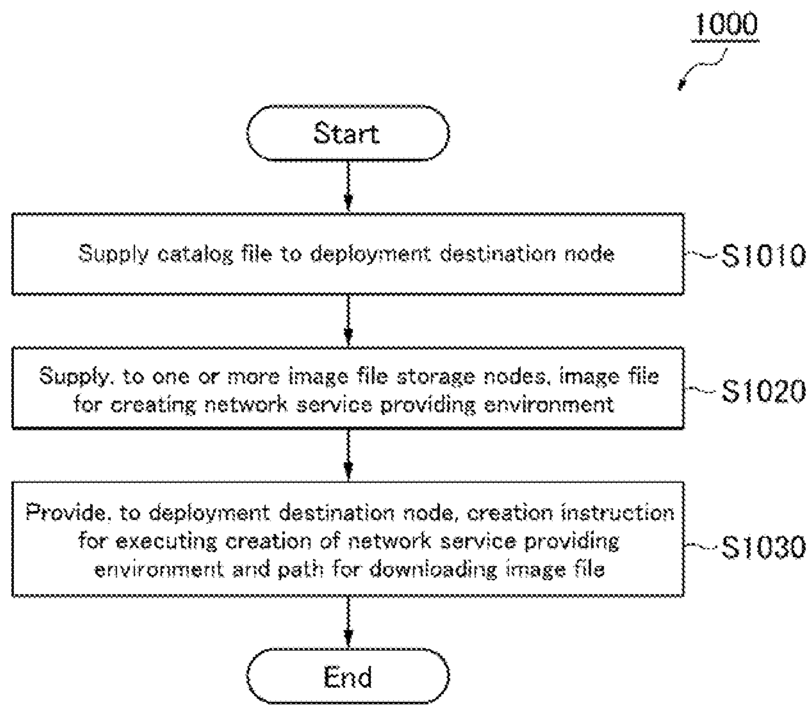
FIG. 6 is a flowchart that illustrates an example of a method for creating a network service providing environment according to the present embodiment.

A deployment control method 1000 according to the present embodiment will be described with reference to FIG. 6. This method can be executed by a deployment control server.

The deployment control method 1000 includes supplying a catalog file to a deployment destination node (reference sign S1010). Here, a network service providing environment is created at the deployment destination node. The catalog file is a file for referencing a path for downloading an image file for the deployment destination node to create a network service providing environment. The path is written using a variable.

The deployment control method 1000 includes supplying an image file for creating a network service providing environment to one or more image file storage nodes (reference sign S1020). Here, the image file storage nodes are different from the deployment destination node.

The deployment control method 1000 includes providing, to the deployment destination node, a creation instruction for executing creation of the network service providing environment, and the path for downloading the image file (reference sign S1030). Here, the creation instruction is a creation instruction to download the image file from the path written in the catalog file and thereby execute creation of the network service providing environment. The path is a path for downloading the image file from one of one or more image file storage nodes as an argument with respect to the variable written in the catalog file.

The present disclosure also includes a program for causing a system to execute the deployment control method 1000 described above. The program may be stored and provided in a computer-readable non-transitory storage medium.

Figure 7:
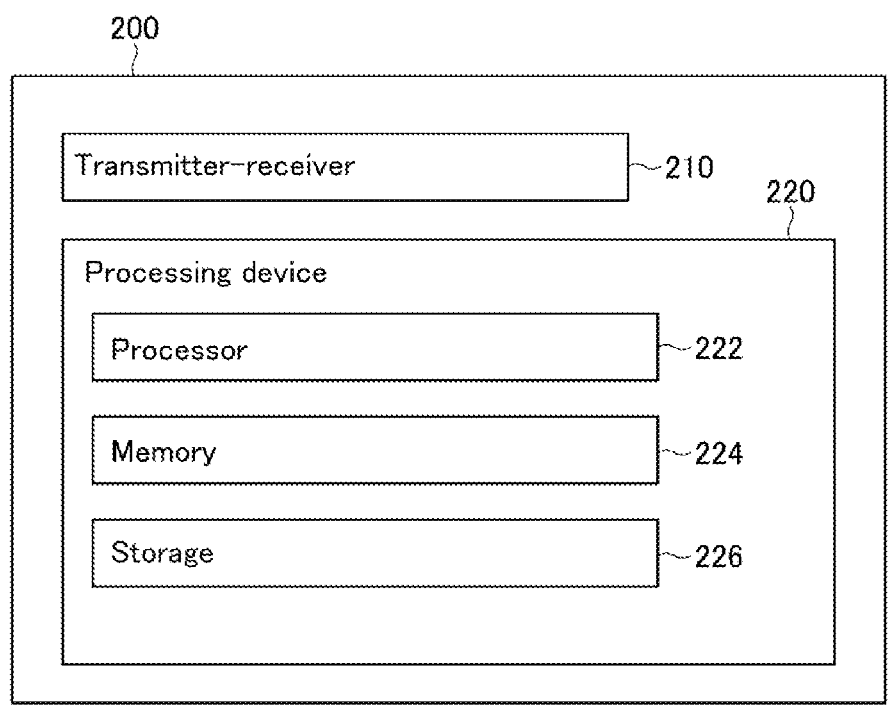
FIG. 7 is a block diagram that illustrates an arrangement of the deployment control server shown in FIG. 3.

Moreover, the deployment control server 200 according to the present embodiment can be implemented by an apparatus shown in the block diagram of FIG. 7.

The deployment control server 200 of FIG. 7 includes a transmitter-receiver 210 and a processing device 220.

The transmitter-receiver 210 exchanges data with an LCM or one or more providing nodes or storages.

The processing device 220 includes a processor 222 and a memory 224. Note that there may be one or more processors 222 and memories 224. The processing device 220 may further include a storage 226. The processing device 220 causes the transmitter-receiver 210 to operate and can perform processing as a deployment control server by means of the processor 222 and the memory 224.

The deployment control server 200 may further include arrangements not shown in FIG. 7.

The present disclosure is not limited to the embodiments discussed above and includes various modified examples in which components have been added, removed, or replaced with respect to the configurations discussed above. In addition, the embodiments may be combined in various ways.

The term "connection" used in the present description refers to a logical connection for the purpose of communication. For example, "A connected to B" means that A and B are logically connected such that communication therebetween is possible. There is no need for A and B to be directly connected in a physical manner by means of physical cables, etc., and A and B may be connected via multiple devices or by radio communication.

Further, the present disclosure includes the following aspects.

[1] A deployment control server comprising one or more processors, wherein at least one of the one or more processors executes:

- supplying, to a deployment destination node in which a network service providing environment is to be created, a catalog file for referring a path to which the deployment destination node refers in order to download an image file for creating the network service providing environment, the path being written using a variable;
- supplying, to one or more image file storage nodes that are different from the deployment destination node, the image file for creating the network service providing environment; and
- providing, to the deployment destination node, a creation instruction to download the image file from the path written in the catalog file and thereby execute creation of the network service providing environment, and the path for downloading the image file from one of the one or more image file storage nodes as an argument with respect to the variable.

[2] The deployment control server of [1], wherein at least one of the one or more processors further executes:

- estimating each time required for the deployment destination node to download the image file from each of the one or more image file storage nodes; and
- based on each of the estimated times, selecting from among the one or more image file storage nodes, an image file storage node from which the deployment destination node is to download the image file.

[3] The deployment control server of [1], wherein at least one of the one or more processors further executes:

- based on respective traffic between the deployment destination node and each of the one or more image file storage nodes, selecting from among the one or more image file storage nodes, an image file storage node from which the deployment destination node is to download the image file.

[4] The deployment control server of [1], wherein at least one of the one or more processors further executes:

based on respective traffic between each of the one or more image file storage nodes and a relay node that exists on a communication route between the deployment destination node and the one or more image file storage nodes, selecting from among the one or more image file storage nodes, an image file storage node from which the deployment destination node is to download the image file.

[5] The deployment control server of [4], wherein the one or more image file storage nodes exist in a first network with a ring structure, the deployment destination node exists in a second network with a ring structure, and the at least one of the one or more processors selects, as the relay node, a boundary node that connects the first network and the second network.

[6] The deployment control server of any one of [1] to [5], wherein the deployment destination node is an execution environment in a Group Center (GC).

[7] The deployment control server of any one of [1] to [5], wherein the deployment destination node is an execution environment in a Regional Data Center (RDC).

[8] The deployment control server of any one of [1] to [7], wherein the image file storage node is a storage in an RDC.

[9] A communication network system comprising:

a deployment control server;

a deployment destination node in which a network service providing environment is to be deployed; and an image file storage node that stores an image file for deploying the network service providing environment, wherein the deployment control server executes:

supplying, to the deployment destination node, a catalog file for referring a path to which the deployment destination node refers in order to download an image file, the path being written using a variable;

supplying, to the one or more image file storage nodes, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable, and wherein the deployment destination node downloads the image file, based on the creation instruction and the argument, from the image file storage node that was made the argument to create the network service providing environment.

[10] A method for controlling deployment, comprising:

supplying to a deployment destination node in which a network service providing environment is to be created, a catalog file for referring a path to which the deployment destination node refers in order to download an image file for creating the network service providing environment, the path being written using a variable;

supplying, to one or more image file storage nodes that are different from the deployment destination node, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable.

REFERENCE SIGNS LIST

1 Communication network system
2 Group of providing nodes
7 Interface
8 Base station
9 Information processing apparatus
10 CDC
20, 21, 22, 23 RDC
30, 31, 32, 33, 34, 35, 36, 37, 38 GC
51, 52, 53, 54, 55 Boundary node
61, 62, 63, 64, 65, 66, 67, 68 Boundary node
80 Group of base stations
100 LCM
200 Deployment control server
201 Providing node selector
202 Download source selector
203 Catalog supplier
204 Image file supplier
205 Creation instruction part
300 Storage
400 Traffic management apparatus
1000 Deployment control method

The invention claimed is:

1. A method for controlling deployment, comprising:

supplying, to a deployment destination node in which a network service providing environment is to be created, a catalog file for referring a path to which the deployment destination node refers in order to download an image file for creating the network service providing environment, the path being written using a variable;

supplying, to one or more image file storage nodes that are different from the deployment destination node, the image file for creating the network service providing environment;

providing, to the deployment destination node, a creation instruction to download the image file from the path written in the catalog file and thereby execute creation of the network service providing environment, and the path for downloading the image file from one of the one or more image file storage nodes as an argument with respect to the variable, wherein the catalog file is stored on a first network including one or more ring structures, the one or more image file storage nodes exist in a second network including two or more ring structures, the deployment destination node exists in a third network including two or more ring structures, at least one ring of the first network is connected to at least one ring of the second network, at least one ring of the second network is connected to at least one ring of the third network;

identifying a first ring network to which the deployment destination node belongs;

determining a second ring network to which the ring network including the deployment destination node is connected based on topology information; and selecting the one of the one or more image file storage nodes from among image file storage nodes included in the second ring network to which the deployment destination node's ring network is connected.

2. A deployment control server comprising one or more processors, wherein at least one of the one or more processors executes:

supplying, to a deployment destination node in which a network service providing environment is to be created, a catalog file for referring a path to which the deployment destination node refers in order to download an image file for creating the network service providing environment, the path being written using a variable;

supplying, to one or more image file storage nodes that are different from the deployment destination node, the image file for creating the network service providing environment; and providing, to the deployment destination node, a creation instruction to download the image file from the path written in the catalog file and thereby execute creation of the network service providing environment, and the path for downloading the image file from one of the one or more image file storage nodes as an argument with respect to the variable, wherein the deployment control server exists in a first network including one or more ring structures, the one or more image file storage nodes exist in a second network including two or more ring structures, the deployment destination node exists in a third network including two or more ring structures, at least one ring of the first network is connected to at least one ring of the second network, at least one ring of the second network is connected to at least one ring of the third network;

identifying a first ring network to which the deployment destination node belongs;

determining a second ring network to which the ring network including the deployment destination node is connected based on topology information; and selecting the one of the one or more image file storage nodes from among image file storage nodes included in the second ring network to which the deployment destination node's ring network is connected.

3. The deployment control server according to claim 2, wherein at least one of the one or more processors further executes:

estimating each time required for the deployment destination node to download the image file from each of the one or more image file storage nodes; and based on each of the estimated times, selecting from among the one or more image file storage nodes, an image file storage node from which the deployment destination node is to download the image file.

4. The deployment control server according to claim 2, wherein at least one of the one or more processors further executes:

based on respective traffic between the deployment destination node and each of the one or more image file storage nodes, selecting from among the one or more image file storage nodes, an image file storage node from which the deployment destination node is to download the image file.

5. The deployment control server according to claim 2, wherein at least one of the one or more processors further executes:

based on respective traffic between each of the one or more image file storage nodes and a relay node that exists on a communication route between the deployment destination node and the one or more image file storage nodes, selecting from among the one or more image file storage nodes, an image file storage node from which the deployment destination node is to download the image file.

6. The deployment control server according to claim 5, wherein the at least one of the one or more processors selects, as the relay node, a boundary node that connects the first network and the second network.

7. The deployment control server according to claim 2, wherein the deployment destination node is an execution environment in a Group Center (GC), wherein the GC stores fewer files than a Central Data Center (CDC) associated with the deployment control server.

8. The deployment control server according to claim 2, wherein the deployment destination node is an execution environment in a Regional Data Center (RDC), wherein the RDC stores fewer files than a Central Data Center (CDC) associated with the deployment control server.

9. The deployment control server according to claim 2, wherein the image file storage node is a storage in an RDC, wherein the RDC stores fewer files than a Central Data Center (CDC) associated with the deployment control server.

10. The deployment control server according to claim 2, wherein a first ring of the third network is connected to a first ring of the second network, but not a second ring of the second network; and the image file for creating the network service providing environment is supplied to one or more image file storage nodes based on the one or more storage nodes sharing a ring with the deployment destination node.

11. The deployment control server according to claim 2, wherein the catalog file contains configuration information including the path of the image file written as the variable, wherein the variable enables designation of different download sources without preparing different catalog files for each download source, and wherein the providing the path as an argument comprises designating one of the one or more image file storage nodes by providing a path to that the one of the one or more image file storage node as a replacement value for the variable.

12. A communication network system comprising:

a deployment control server;

a deployment destination node in which a network service providing environment is to be deployed; and one or more non-transitory image file storage nodes, wherein an image file storage node stores an image file for deploying the network service providing environment, wherein the deployment control server executes:

supplying, to the deployment destination node, a catalog file for referring a path to which the deployment destination node refers in order to download an image file, the path being written using a variable;

supplying, to the one or more image file storage nodes, the image file for creating the network service providing environment;

providing, to the deployment destination node, a creation instruction to download the image file from the path written in the catalog file and thereby execute creation of the network service providing environment, and the path for downloading the image file from one of the one or more image file storage nodes as an argument with respect to the variable, and wherein the deployment destination node downloads the image file, based on the creation instruction and the argument, from the image file storage node that was made the argument to create the network service providing environment, wherein the deployment control server exists in a first network including one or more ring structures, the one or more image file storage nodes exist in a second network including two or more ring structures, the deployment destination node exists in a third network including two or more ring structures, at least one ring of the first network is connected to at least one ring of the second network; and at least one ring of the second network is connected to at least one ring of the third network;

identifying a first ring network to which the deployment destination node belongs;

determining a second ring network to which the ring network including the deployment destination node is connected based on topology information; and selecting the one of the one or more image file storage nodes from among image file storage nodes included in the second ring network to which the deployment destination node's ring network is connected.

* * * * *